United States Patent [19]
Foord

[11] 3,882,378
[45] May 6, 1975

[54] LEAKAGE SURGE INDICATOR

[75] Inventor: Peter M. Foord, Eastwood, Australia

[73] Assignee: The Electricity Trust of South Australia, Eastwood, Australia

[22] Filed: Apr. 12, 1973

[21] Appl. No.: 350,340

[52] U.S. Cl. .................. 324/54; 324/102; 324/133
[51] Int. Cl. ...................... G01r 31/02; G01r 19/00
[58] Field of Search.......... 324/102, 133, 54, 103 R, 324/99 R

[56] References Cited
UNITED STATES PATENTS

| | | |
|---|---|---|
| 2,728,889 | 12/1955 | Briner .................................. 324/54 |
| 2,752,589 | 6/1956 | DeLong, Jr. ..................... 324/103 R |
| 2,972,126 | 2/1961 | Hecox et al. ...................... 324/99 D |
| 3,063,008 | 11/1962 | Grady, Jr. ............................. 324/54 |

Primary Examiner—Alfred E. Smith
Assistant Examiner—Ernest F. Karlsen
Attorney, Agent, or Firm—Oldham & Oldham Co.

[57] ABSTRACT

An indicator to indicate or count or record the leakage surge across an insulator of a high voltage transmission line.

3 Claims, 1 Drawing Figure

LEAKAGE SURGE INDICATOR

This invention relates to a leakage surge indicator and particularly relates to a leakage surge indicator and counter to indicate and monitor leakage currents across high voltage line insulators.

BACKGROUND OF INVENTION

In high voltage transmission lines when the surface of the insulators becomes polluted and particularly where moisture is present, leakage currents can build up to quite high values. In so doing, however they generate heat and partially dry out the surface with a consequent reduction in leakage current and this action results in leakage currents which come in surges.

The present technique in eliminating or reducing these leakage currents is to periodically clean the insulators, and this in problem areas is a frequent occurrence especially when the transmission line traverses high pollution areas such as industrial areas, coastal installations and the lines traversing areas such as salt flats and the like and in these areas the cleaning must be carried out at periods of up to every two or three years.

It has been determined that these surges which are bursts of current for a short duration, typically last for about 20 cycles in a 50 cycles per second alternating current transmission line and are followed by a quiescent or low current period of a few minutes. The current is a 50 Hertz current with a somewhat peaky wave shape. The leading edge of each half cycle is usually fairly steep due to partial flashovers bridging out high resistance dry bands.

It has been found that these surges can be recorded and/or counted irrespective of whether they last for only one half cycle or longer and that the resultant duration of current to cause a count is approximately two milliseconds.

Hence it is an object of this invention to provide a means of determining if the leakage occurs and also determine the value and frequency of the surges.

SUMMARY OF INVENTION

Thus there is provided according to this invention a leakage surge indicator to indicate the electrical leakage surge across an insulator comprising means to sense the current level of the leakage and means responsive to the voltage developed across the sensing means as the current level through the sensing means reaches a predetermined value to trigger an indicator to indicate and/or record the leakage surge.

Preferably the indicator is a counter to record the number of surges occurring over a specific period. Instead of recording the surges of one particular value only, it is preferred that the indicator can record surges of two or more, preferably three values, and a separate counter is provided for each value selected.

In one form of the invention there is a five second reset period before the counter again samples the leakage current.

Preferably three levels of peak current are monitored, 100mA, 150mA and 200mA. No external power supply is required as the power to drive the counters and reset circuits is derived from the leakage currents. Also the device is preferably fully protected against excessive leakage currents caused by a flashover on the insulators.

In a preferred embodiment of the invention an extra disc is inserted in the insulator string and by connecting the insulator lead from one disc down from the earthed end, the leakage current can be diverted to the counter. A lead having standard 415 volt insulation is sufficient and forms a measure of protection in the case of insulator flashover. In the case of flashover the insulator lead would have to be replaced.

The counter is installed on the tower, pylon or pole supporting the transmission line and a flashing neon lamp is installed on the front panel of the unit to indicate that leakage current is flowing through the device. Only a few microamps of leakage current are required to operate the neon lamp so it is anticipated that it will operate even under the best of clean and dry conditions.

BRIEF DESCRIPTION OF DRAWINGS

Referring to the single FIGURE of the drawing there is shown a circuit diagram of a counter to monitor three levels of peak current.

DESCRIPTION OF PREFERRED EMBODIMENT

Figure 1:
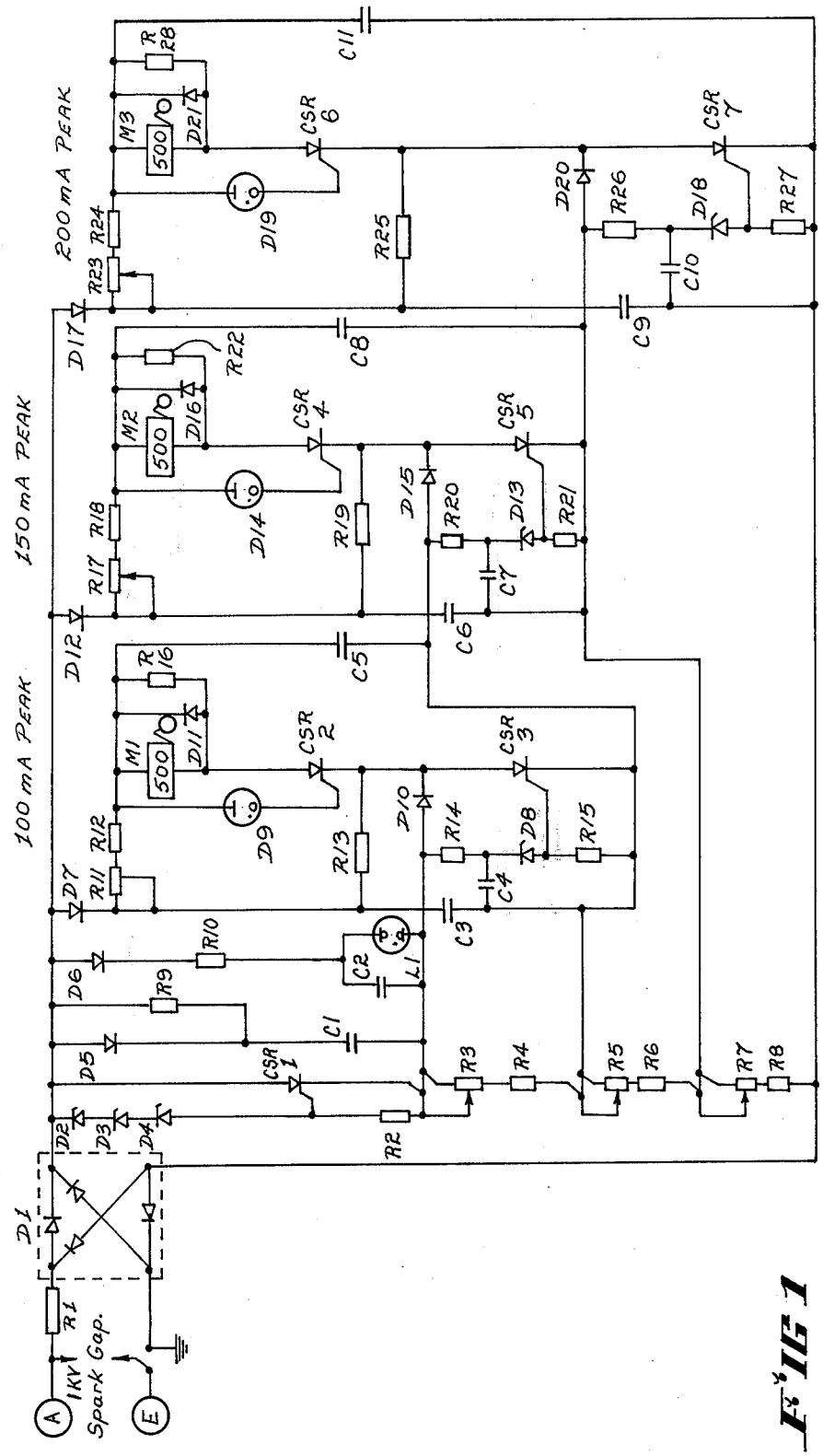

Leakage current from the insulator string enters at terminal A and returns to earth via terminal E.

The terminal A is connected to a resistor $R_1$ having a value to protect the circuitry of the device such that upon flashover the heavy current is diverted through a spark gap, to earth due to the voltage rise across the resistors.

The leakage current is first rectified by a full wave bridge $D_1$. This rectified current energises a power supply circuit comprising a thyristor $CSR_1$ and zener diodes $D_2$, $D_3$, $D_4$ and diodes $D_5$, $D_6$, $D_7$, $D_{12}$, and $D_{17}$, and then passes to a series of level sensing resistors, $R_3$ and $R_4$, $R_5$ and $R_6$, $R_7$ and $R_8$, these being adjustable to determine the three values of leakage as desired.

A circuit to limit the rate of voltage rise across the power supply circuit thryistor $CSR_1$ is connected in parallel with the power supply circuit and includes diode $D_5$ and capacitor $C_1$ with a resistance $R_9$. Also in parallel with the supply circuit there is provided a relaxation oscillator circuit comprising diode $D_6$, capacitor $C_2$ and including a neon lamp $L_1$ to indicate that leakage current is being monitored.

The series of level sensing resistors $R_3$ to $R_8$ are divided into groups of $R_3$ and $R_4$, $R_5$ and $R_6$, $R_7$ and $R_8$, each group controlling a separate staged monitor to count the peaks of the desired value for each stage.

For conveniences, only stage one will be described, the remaining stages being identical except for the value of the level sensing resistors.

Initially the thyristor $CSR_1$ in the power supply circuit is not conducting and the leakage current flows into condensers $C_1$, $C_3$, $C_6$ and $C_9$ in each stage via diodes $D_5$, $D_7$, $D_{12}$ and $D_{17}$ to charge the condensers. When the combined voltage across these condensers $C_1$, $C_3$, $C_6$ and $C_9$ reaches the combined zener voltage of the zener diodes $D_2$, $D_3$ and $D_4$ in the power supply circuit, gate current is supplied and the thyristor $CSR_1$ conducts. Thus the condensers $C_1$, $C_3$, $C_6$ and $C_9$ are charged and subsequent current is diverted through the thyristor $CSR_1$ while the rate of rise of voltage across the thyristor is limited by the circuit $D_5$, $C_1$ and $R_9$ above described.

When say 100mA flows through the sensing resistors $R_3$ and $R_4$ of stage one, sufficient voltage is developed across the resistors $R_3$ and $R_4$ to overcome a further zener diode $D_8$ and pass sufficient gate current into a further thyristor $CSR_3$ connected to the sensing resistors $R_3$ and $R_4$ and the meter $M_1$ through a third thyristor $CSR_2$ to fire the second thyristor $CSR_3$. This action is slowed down by a condenser $C_4$ to ensure that the second thyristor $CSR_3$ is not triggered by spikes of leakage current but requires sufficient current of a millisecond or two to fire it. The meters $M_1$, $M_2$, and $M_3$ can be of any suitable nature but are preferably electromagnetically operated impulse counters.

Once the second thyristor $CSR_3$ conducts it diverts further current for the half cycle of the sensing resistors $R_3$ and $R_4$. However, although the second thyristor $CSR_3$ is fired it will not operate the counter $M_1$ unless the third thyristor $CSR_2$ connected to the counter $M_1$ is also conducting.

This third thyristor $CSR_2$ is controlled by a time delay circuit including a capacitor $C_6$ connected to the sensing $R_3$ and $R_4$ resistors, this capacitor taking a time of five seconds to charge through resistances $R_{11}$ and $R_{12}$ from the power supply condenser $C_3$. When the charging of this capacitor reaches the ignition voltage to neon tube $D_9$ and the neon tube $D_9$ conducts and the third thyristor $CSR_2$ connected to the counter $M_1$ conducts. Hence once the counter $M_1$ has operated, five seconds must elapse before it is possible to record another count.

The energy to operate the counter $M_1$ comes from that stored in the capacitor $C_5$. Also a resistance $R_{13}$ is provided to hold the cathode of the third thyristor $CSR_2$ positive when the second thyristor $CSR_3$ is not conducting, to prevent an indefinite state across the gas filled neon tube $D_9$, (that is, sufficient voltage to fire it but insufficient current).

As stated earlier, the two further stages are identical except for the sensing resistors and each stage also incorporated variable resistances so that the stages may be calibrated to the desired values.

Hence the invention provides a device which will indicate and also count the various values of leakage surges which occur across the insulators. It is merely necessary for a technician to proceed along the transmission line and visually read off the indicators so that it can be determined when cleaning of the insulators is required.

Although one embodiment of the invention has been described it will be realised that various alterations and alternatives may be made to the invention still falling within the scope and consideration of the invention described.

Thus although the invention has been described as being operable with no other power supply other than that of the leakage across the insulator itself, it will be realised that in other instances it may be desirable to have an external power supply. This could be by batteries, or even an inductance situated adjacent the power line, which would generate sufficient power to operate the device.

I claim:

1. A leakage surge indicator for counting the number of surges of electrical leakage current, above preset magnitudes, occurring across a high voltage insulator of an electrical power transmission line, comprising:
   a power supply circuit responsive to the leakage current through said insulator and consisting of rectifiers and capacitors for storing energy from said leakage current;
   a current magnitude sensing circuit including a zener diode and a first thyristor responsive to the current through said insulator for developing a voltage across a resistance to overcome the zener diode and turn on the first thyristor;
   a time delay circuit connected to said sensing circuit and including a timing capacitor, a neon diode, and a second thyristor said timing capacitor being connected to the neon diode for turning on the second thyristor; and
   an impulse counter connected to the second thyristor and actuated by the simultaneous conducting of said first and second thyristors in such a manner that after a count a fixed time must elapse before a further count can be recorded.

2. The leakage surge indicator as recited in claim 1 which further includes equal pluralities of interconnected sensing circuits, time delay circuits, and impulse counters for sensing, indicating and recording leakage surges at a plurality of leakage current levels.

3. The leakage surge indicator as recited in claim 1 wherein the impulse counters are electromagnetically operated counters.

* * * * *